US007282077B2

(12) United States Patent
Honisch et al.

(10) Patent No.: US 7,282,077 B2
(45) Date of Patent: Oct. 16, 2007

(54) AIR CLEANER ASSEMBLY

(75) Inventors: Michael J. Honisch, West Allis, WI (US); Clian Campbell, Brown Deer, WI (US); Derron Bohne, Wauwatosa, WI (US); John Paul McDonald, New Berlin, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 317 days.

(21) Appl. No.: 10/970,971

(22) Filed: Oct. 21, 2004

(65) Prior Publication Data

US 2005/0086918 A1 Apr. 28, 2005

Related U.S. Application Data

(60) Provisional application No. 60/514,209, filed on Oct. 24, 2003.

(51) Int. Cl.
*B01D 46/00* (2006.01)

(52) U.S. Cl. ......................... 55/507; 55/385.3; 55/498; 55/502; 55/529; 55/DIG. 31; 123/198 E

(58) Field of Classification Search .................. 55/498, 55/499, 500, 501, 502, 505, 506, 507, 510, 55/385.3, DIG. 28, DIG. 31, 385.1, 529; 95/273; 123/198 E
See application file for complete search history.

(56) References Cited

U.S. PATENT DOCUMENTS 2,968,361 A * 1/1961 Buckman ..................... 55/419
4,143,739 A 3/1979 Nordlie
4,147,230 A 4/1979 Ormond et al.
4,233,043 A 11/1980 Catterson
4,608,160 A 8/1986 Zoch
4,640,698 A 2/1987 Ohishi et al.
4,697,668 A 10/1987 Barker
4,712,643 A 12/1987 Iles et al.
5,512,086 A 4/1996 Glucksman
5,730,766 A * 3/1998 Clements ................... 55/341.1
5,930,371 A 7/1999 Cheng et al.
6,190,432 B1 * 2/2001 Gieseke et al. ............ 55/385.3
6,197,191 B1 3/2001 Wobben
6,221,122 B1 4/2001 Gieseke et al.
6,348,084 B1 2/2002 Giescke et al.
6,350,291 B1 2/2002 Gieseke et al.
6,383,244 B1 5/2002 Wake et al.
6,511,599 B2 1/2003 Jaroszczyk et al.
6,537,339 B2 3/2003 Schmitz et al.
6,547,857 B2 4/2003 Giescke et al.
6,610,117 B2 8/2003 Giescke et al.
2002/0059867 A1 5/2002 Gieseke et al.
2002/0100262 A1 8/2002 Gieseke et al.

(Continued)

*Primary Examiner*—Duane Smith
*Assistant Examiner*—Robert A Clemente
(74) *Attorney, Agent, or Firm*—Michael Best & Friedrich LLP

(57) ABSTRACT

An air cleaner that includes a first housing portion having a non-circular attachment fit. A second housing portion is attached to the first housing portion to define a filter space. A filter element includes a non-circular filter aperture that defines a perimeter that is completely defined by four equal arc length segments. The filter aperture is engageable with the attachment fit. The attachment fit and the filter aperture are sized to provide substantially equal contact pressure around the perimeter of the filter aperture when engaged with one another.

33 Claims, 19 Drawing Sheets

U.S. PATENT DOCUMENTS

| | | | | |
|---|---|---|---|---|
| 2003/0037675 | A1 | 2/2003 | Gillingham et al. | |
| 2003/0106432 | A1 | 6/2003 | Gieseke et al. | |
| 2003/0182909 | A1 | 10/2003 | Gieseke et al. | |
| 2004/0103787 | A1* | 6/2004 | Gieseke et al. | 95/273 |
| 2005/0072129 | A1* | 4/2005 | Daleiden | 55/385.1 |

* cited by examiner

AIR CLEANER ASSEMBLY

RELATED APPLICATION DATA

This application claims benefit under 35 U.S.C. Section 119(e) of co-pending U.S. Provisional Patent Application Ser. No. 60/514,209 filed Oct. 24, 2003.

BACKGROUND

The present invention relates generally to air cleaner assemblies. More particularly, the present invention relates to air cleaners having replaceable filter elements.

Internal combustion engines are commonly used to provide power for lawn care and gardening implements such as rototillers, lawnmowers, edgers, and the like. These internal combustion engines generally include a carburetor or other air/fuel mixing device that feeds an air/fuel mixture to one or more cylinders.

Particles such as dirt or lawn debris can damage an engine if it is admitted into the engine carburetor or combustion chamber. As such, engines typically include an air filter that filters the air before it is directed to the carburetor. Many filters use a pleated paper filter element that filters the air as the air passes through the paper pleats. The filter element requires periodic replacement to assure the proper function of the filter element.

Most air cleaners include a biasing member, such as a bolt that holds the filter in place and provides for a seal between the filter element and the housing. In most constructions, the bolt clamps two halves of a housing such that the two halves sandwich the filter element. These components add cost and complexity to the filter arrangement.

To change the filter element of prior air cleaners, the user first removes the bolt and one half of the housing. The filter element can then be removed from the second half of the housing. Unfortunately, nothing inhibits dirt and debris from falling off the filter element and entering the air intake portion of the housing. This debris may be ingested by the engine and can cause damage.

SUMMARY

The invention provides an air cleaner that includes a first housing portion having a non-circular attachment fit and a second housing portion attached to the first housing portion to define a filter space. A filter element includes a non-circular filter aperture that has a perimeter. The perimeter is engageable with the attachment fit. The attachment fit and the filter aperture are sized to provide substantially equal contact pressure around the perimeter when the perimeter is engaged with the attachment fit.

The invention also provides a filter element for use in an air cleaner that has an attachment fit. The filter element includes a substantially oval filter perimeter that defines an outlet. The perimeter includes a filter end portion that has a filter end stiffness and a filter side portion that has a filter side stiffness. The filter perimeter is engageable with the attachment fit. A stiffening member is disposed outside of the outlet and adjacent the filter side portion such that the filter side stiffness is substantially equal to the filter end stiffness when the filter perimeter is engaged with the attachment fit.

The invention further provides a filter element for use with an air cleaner that has an attachment perimeter. The filter element includes a first end cap and a second end cap that includes a perimeter. The perimeter defines a first side portion that has a side stiffness, a first end portion that has an end stiffness, and an outlet aperture. A filter media is disposed between the first end cap and the second end cap and a stiffening member is positioned to increase the side stiffness relative to the end stiffness.

Additional features and advantages will become apparent to those skilled in the art upon consideration of the following detailed description exemplifying the best mode of carrying out the invention as presently perceived.

BRIEF DESCRIPTION OF THE DRAWINGS

The detailed description particularly refers to the accompanying figures in which.

Figure 2:
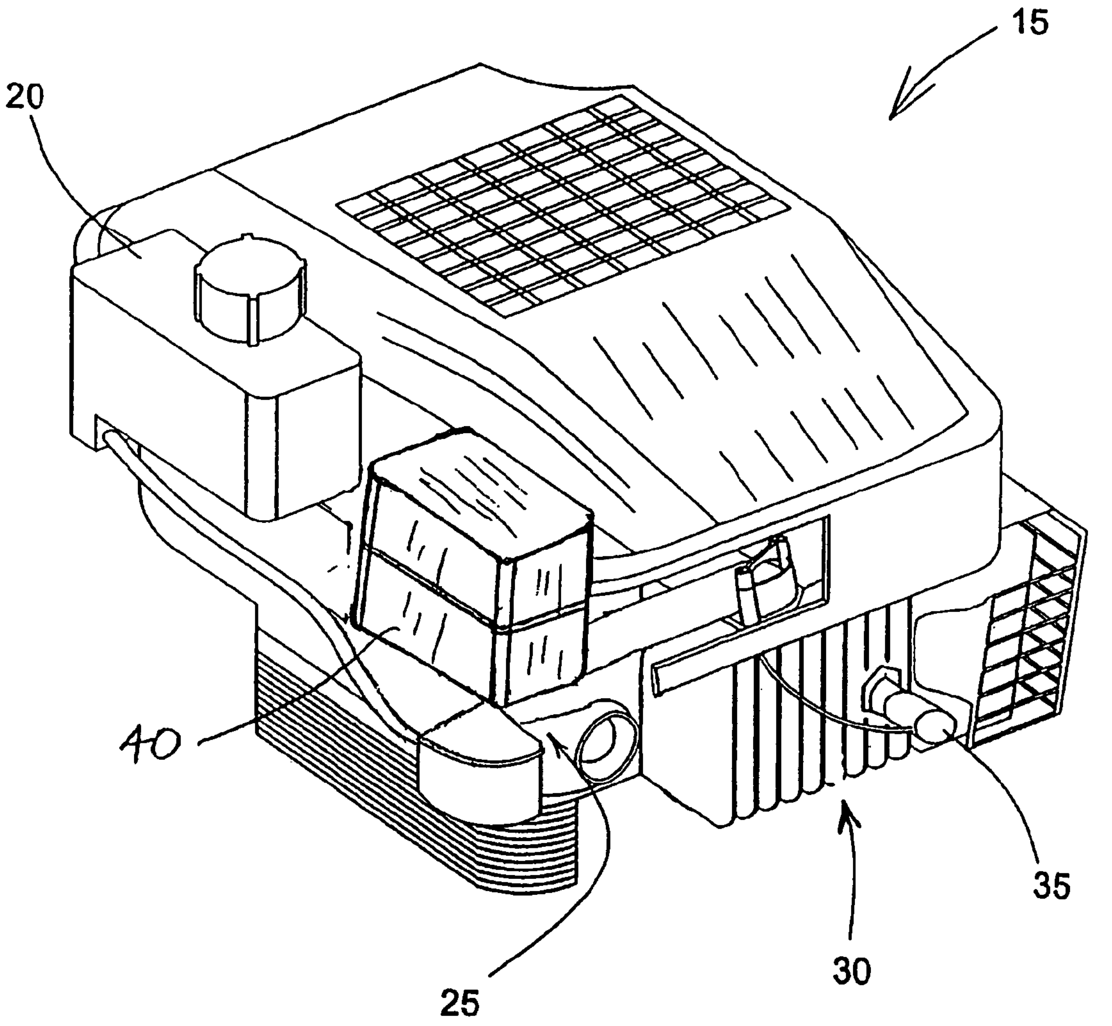
FIG. 2 is a perspective view of the engine of FIG. 1 including an air cleaner assembly.
Figure 5:
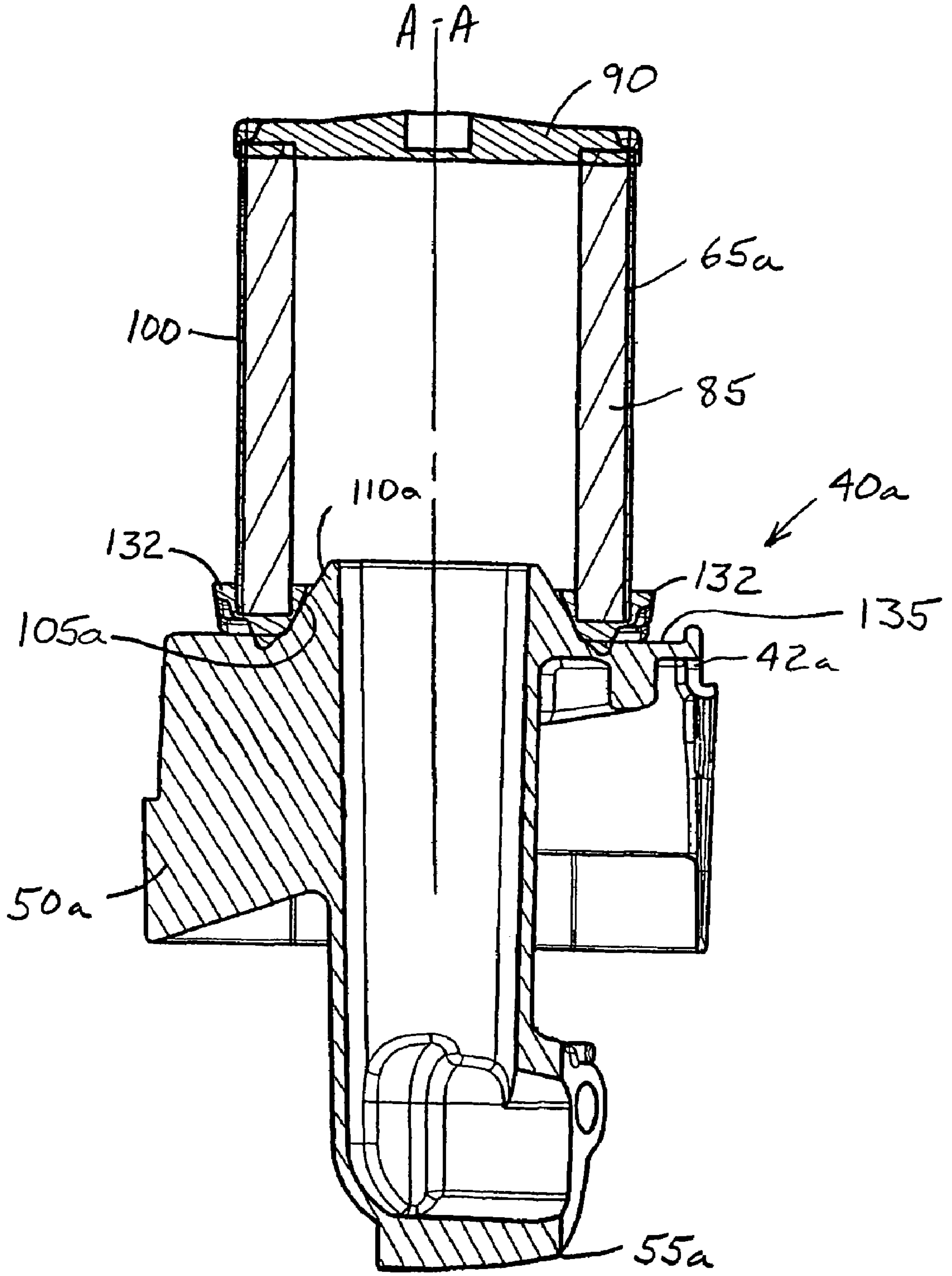
Figure 6:
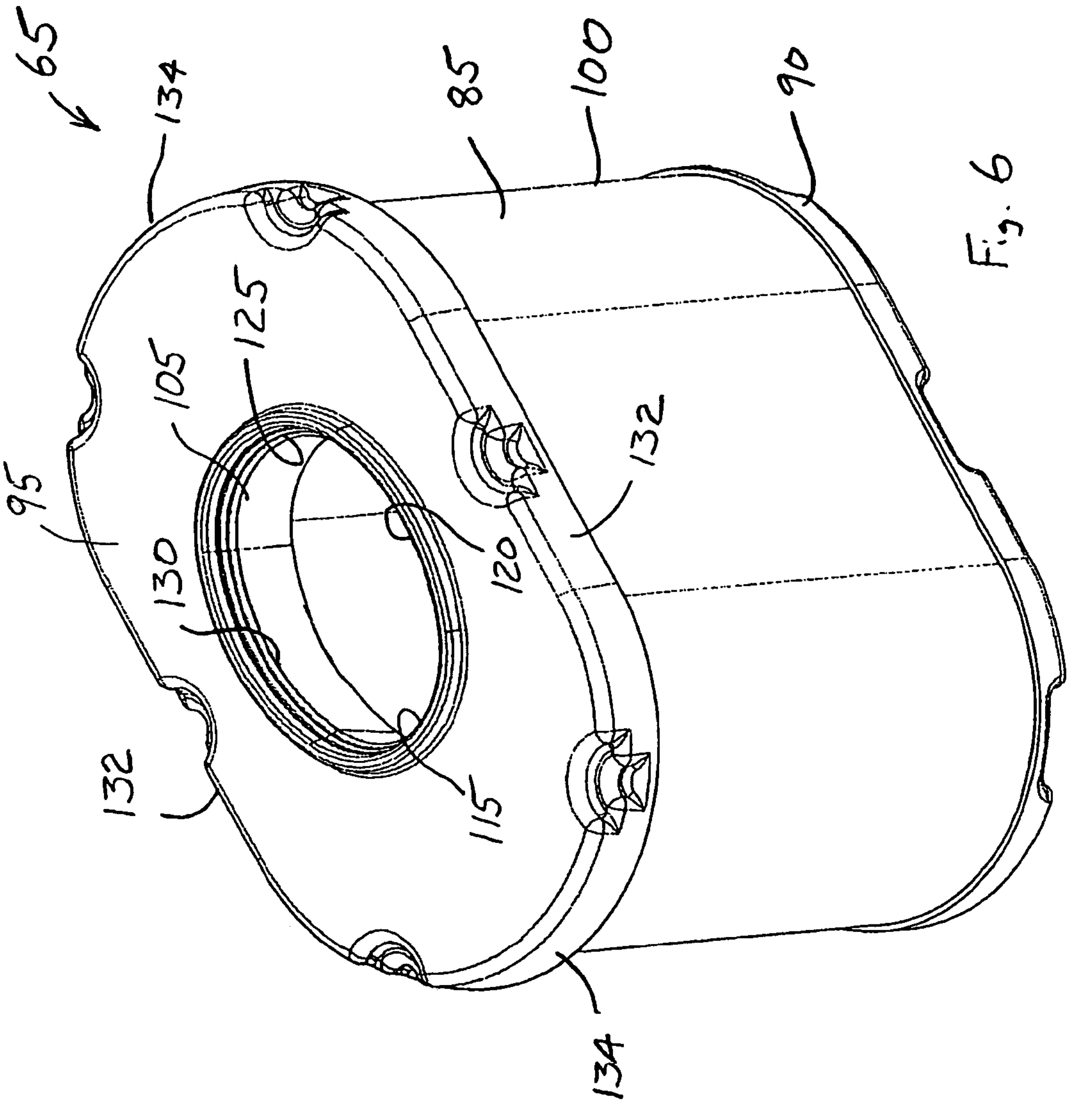
Figure 7:
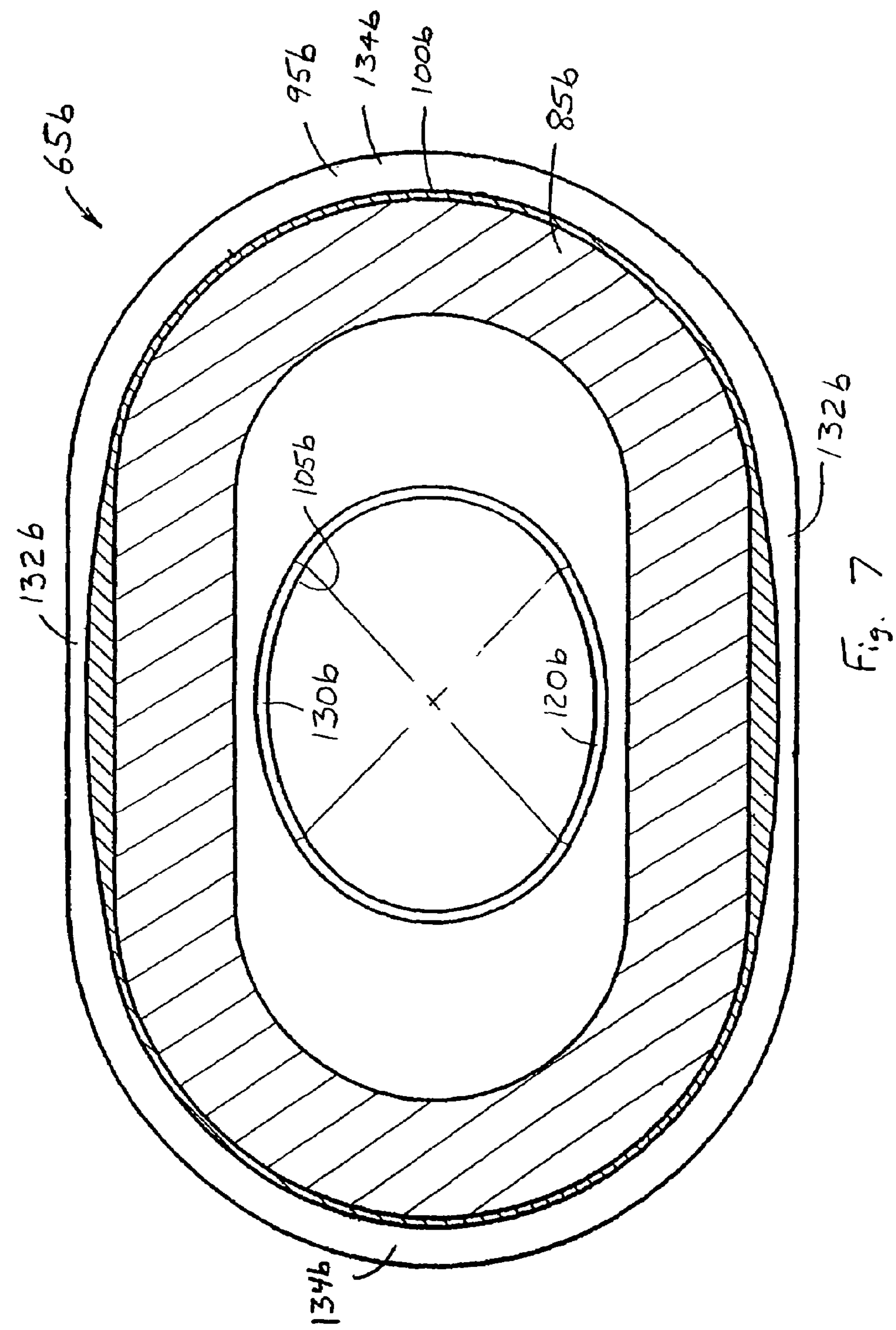
Figure 8:
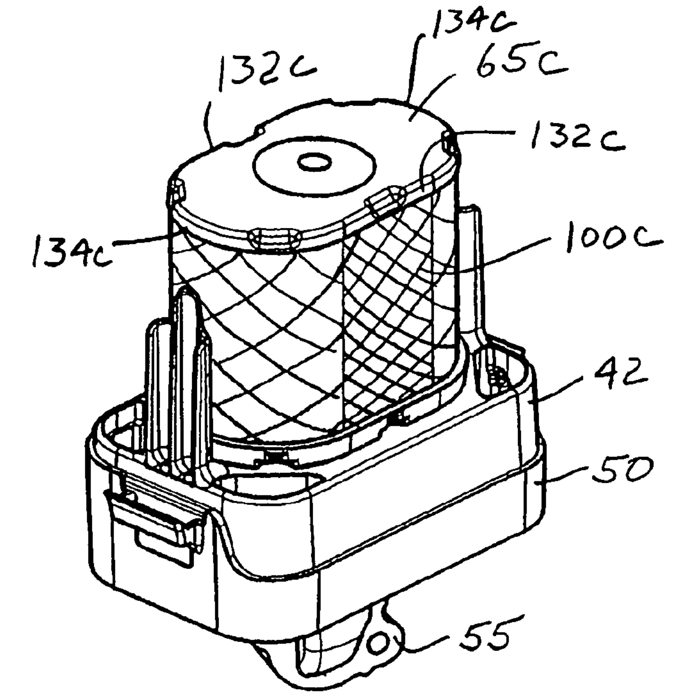
Figure 9:
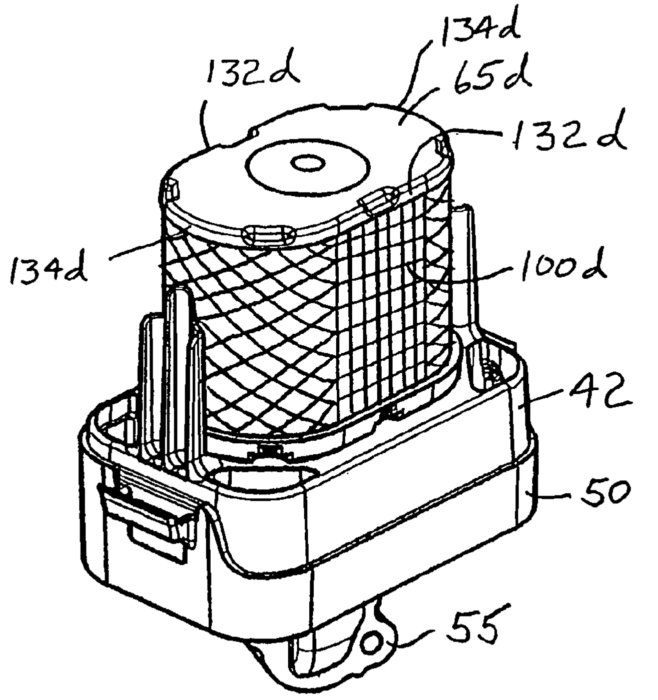
Figure 10:
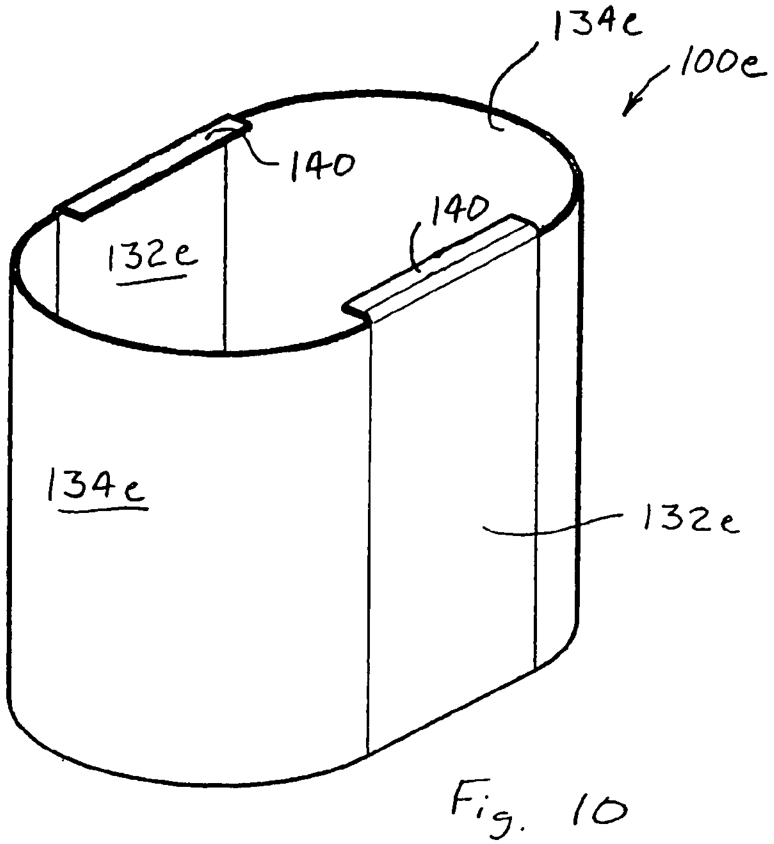
Figure 13:
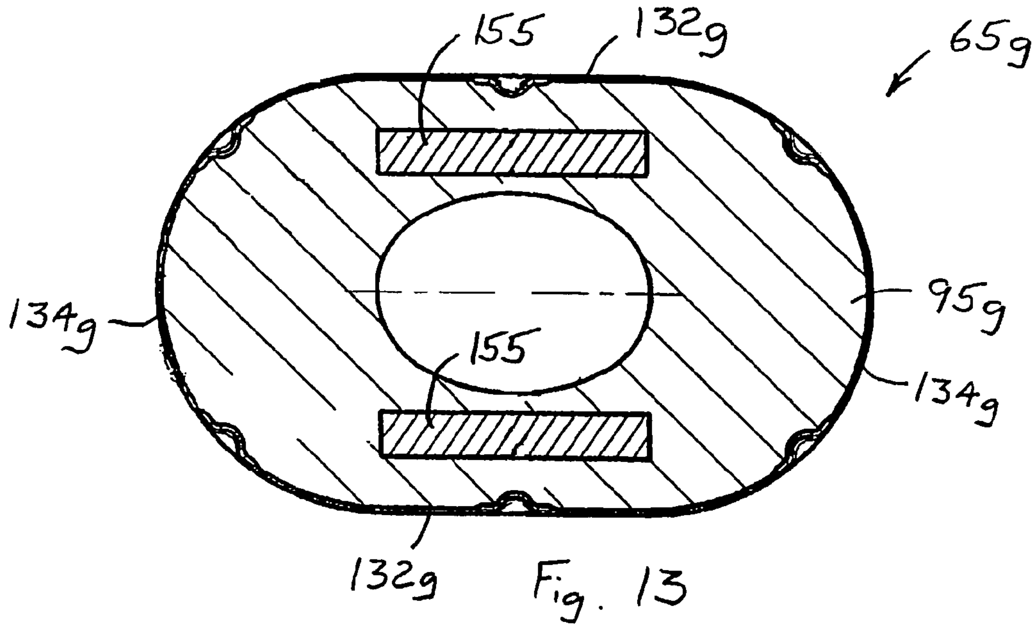
Figure 11:
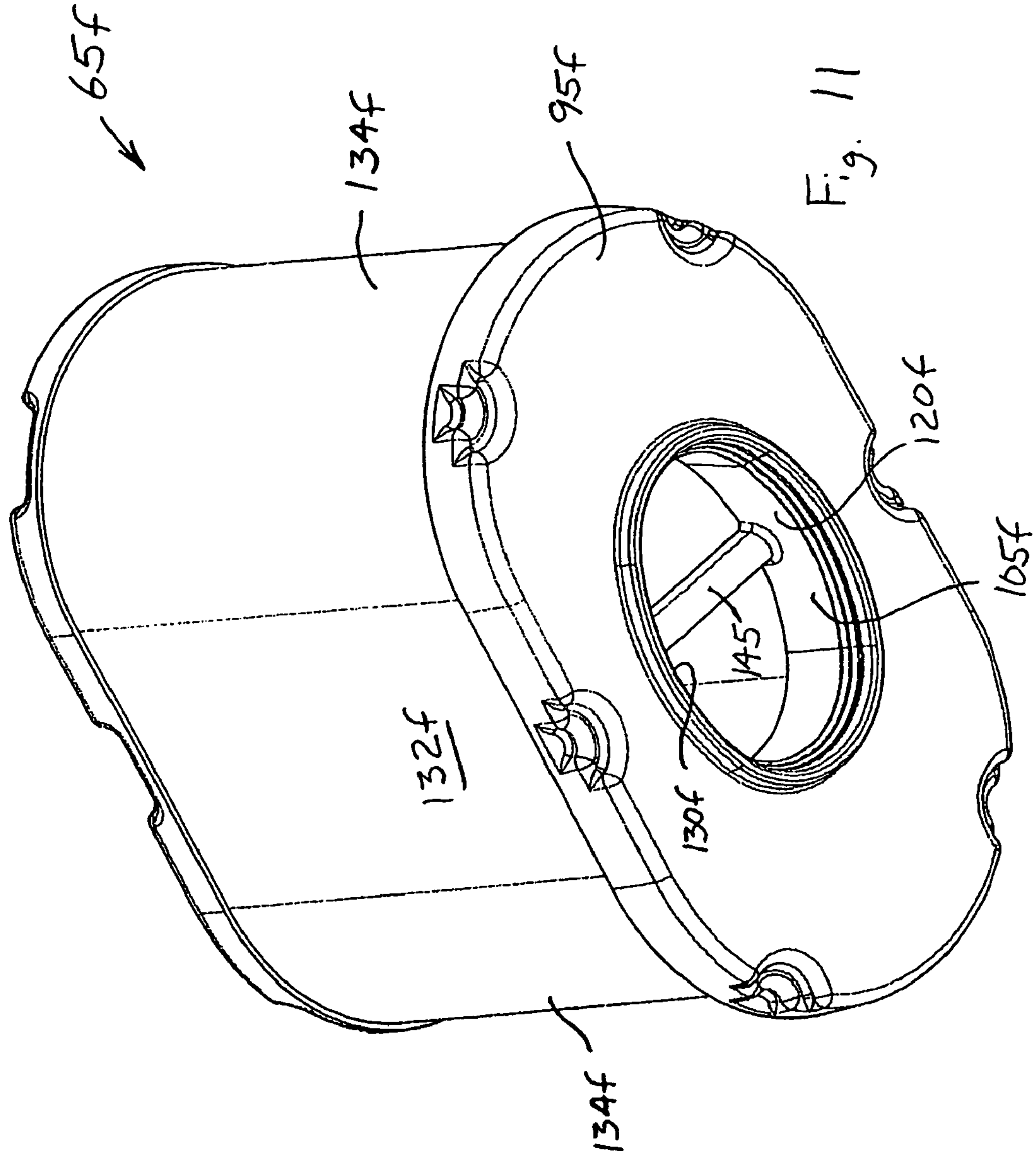
Figure 12:
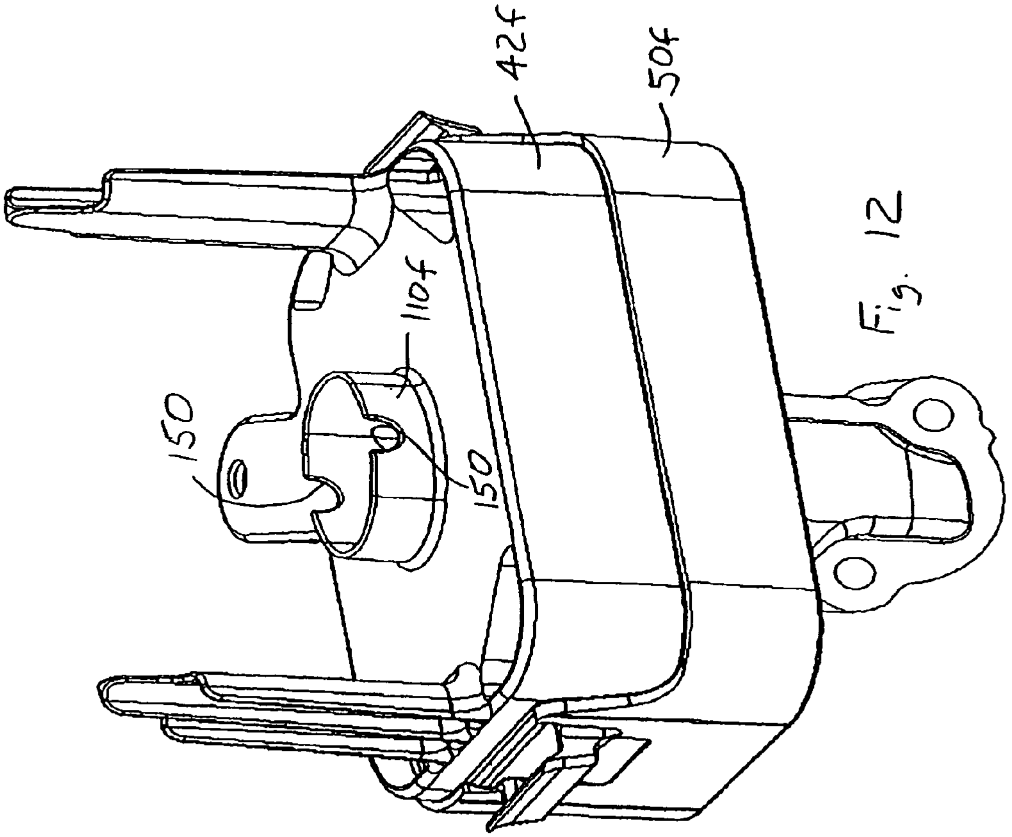
Figure 14:
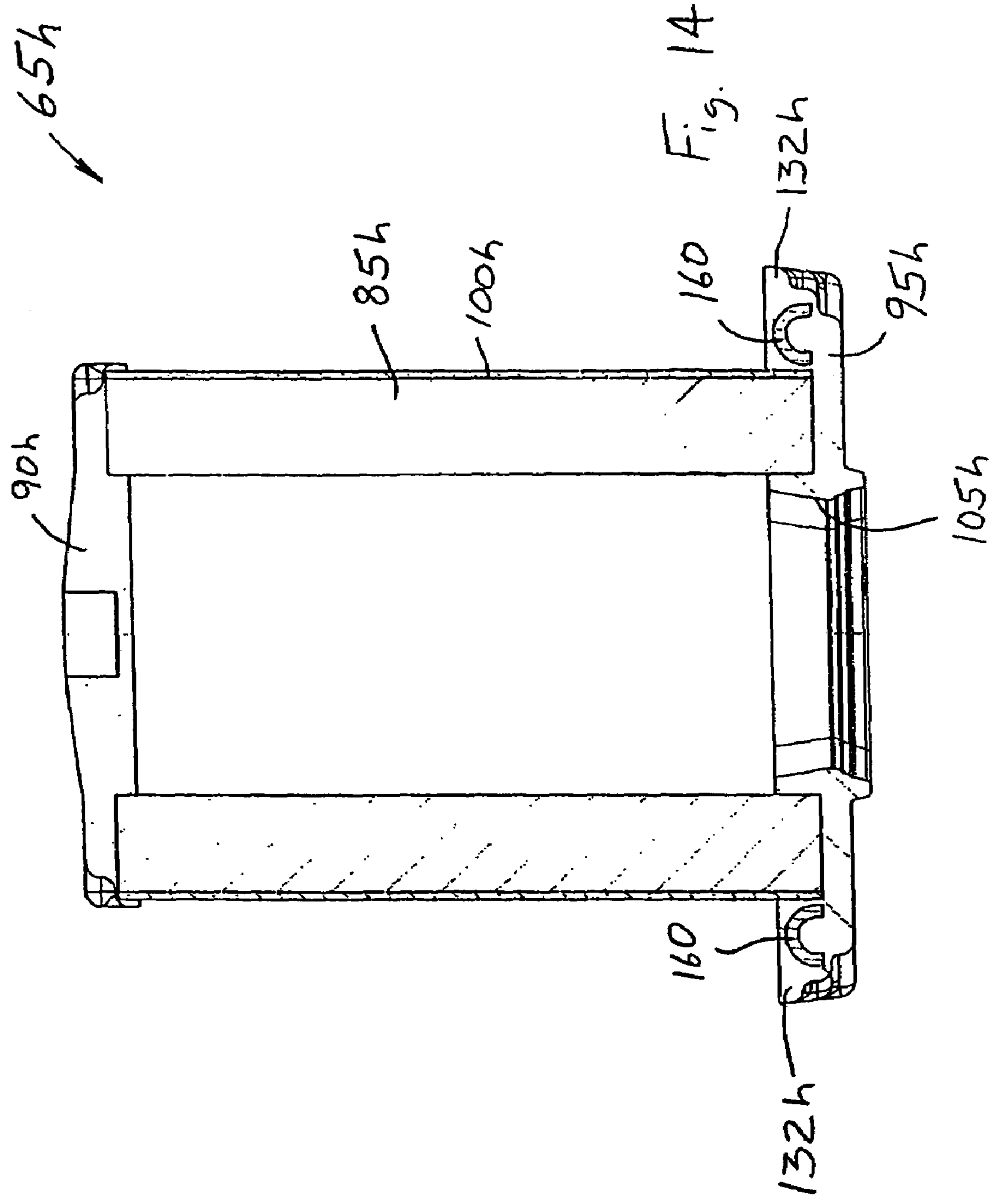
Figure 15:
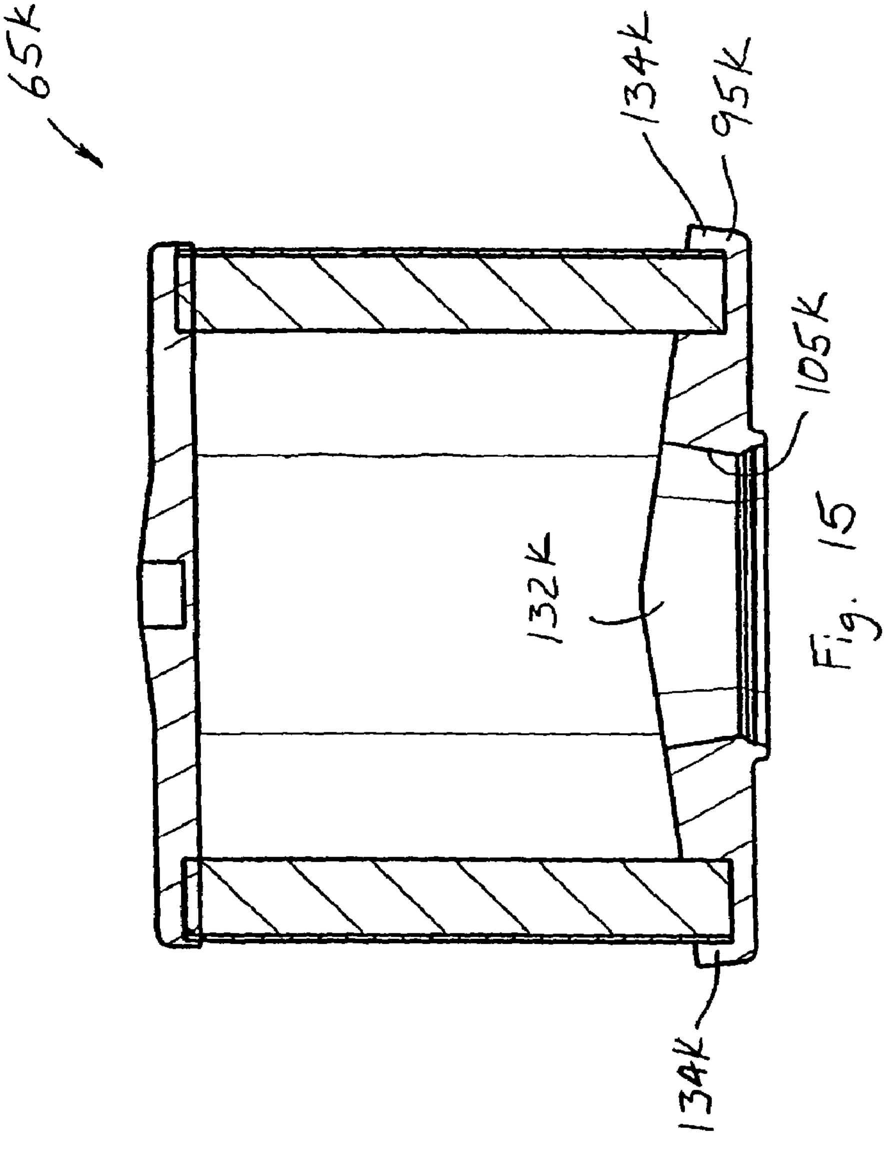
Figure 16:
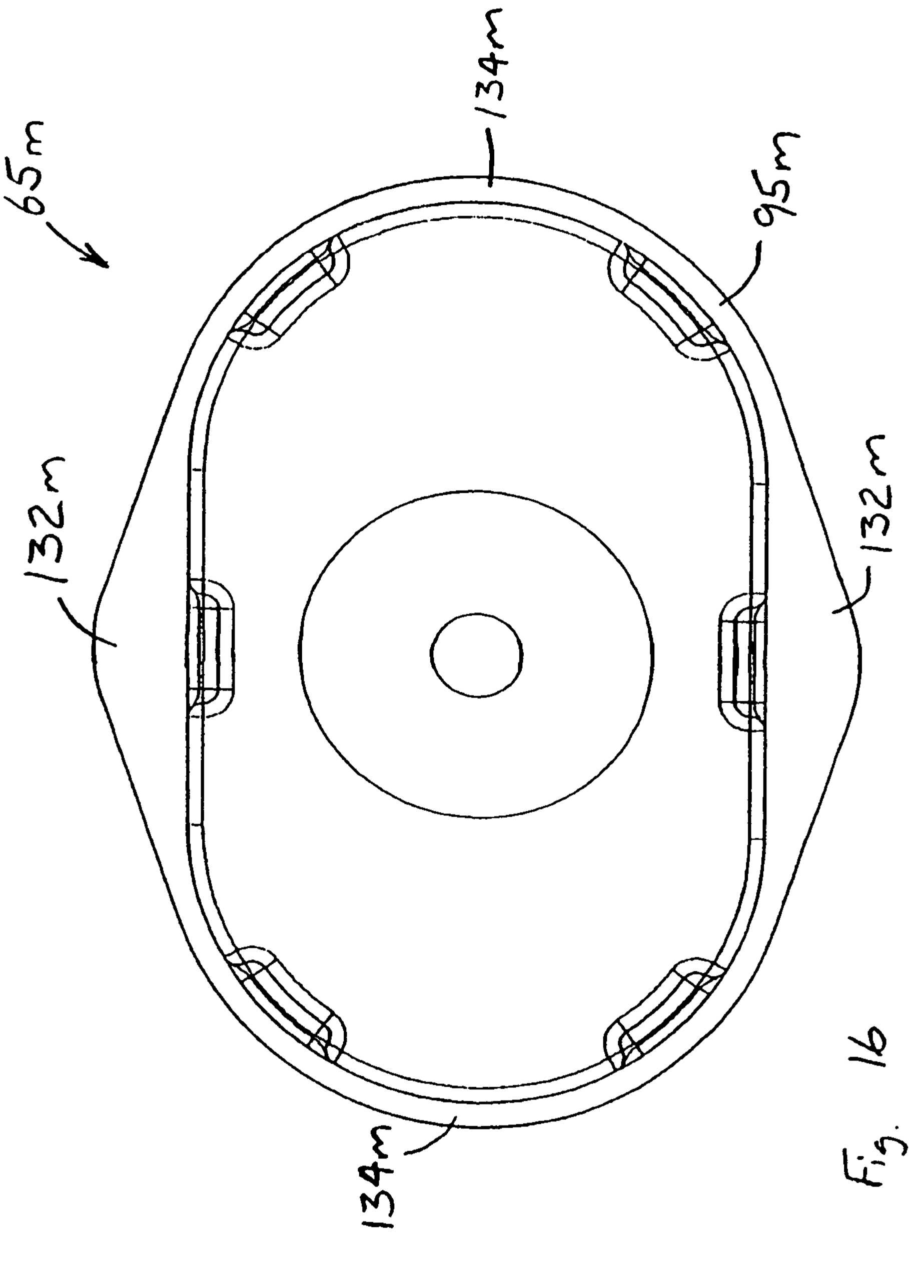
Figure 17:
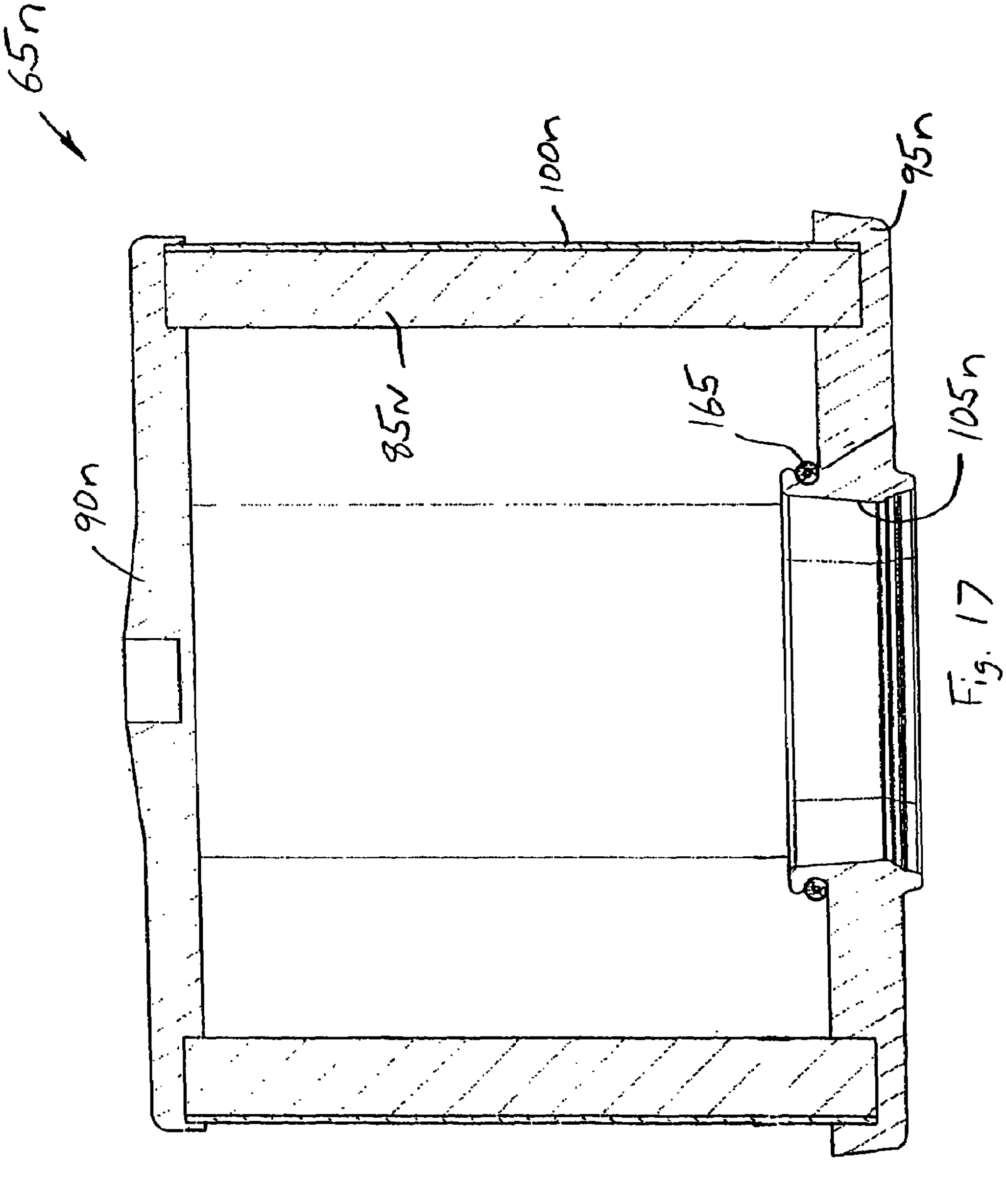
Figure 18:
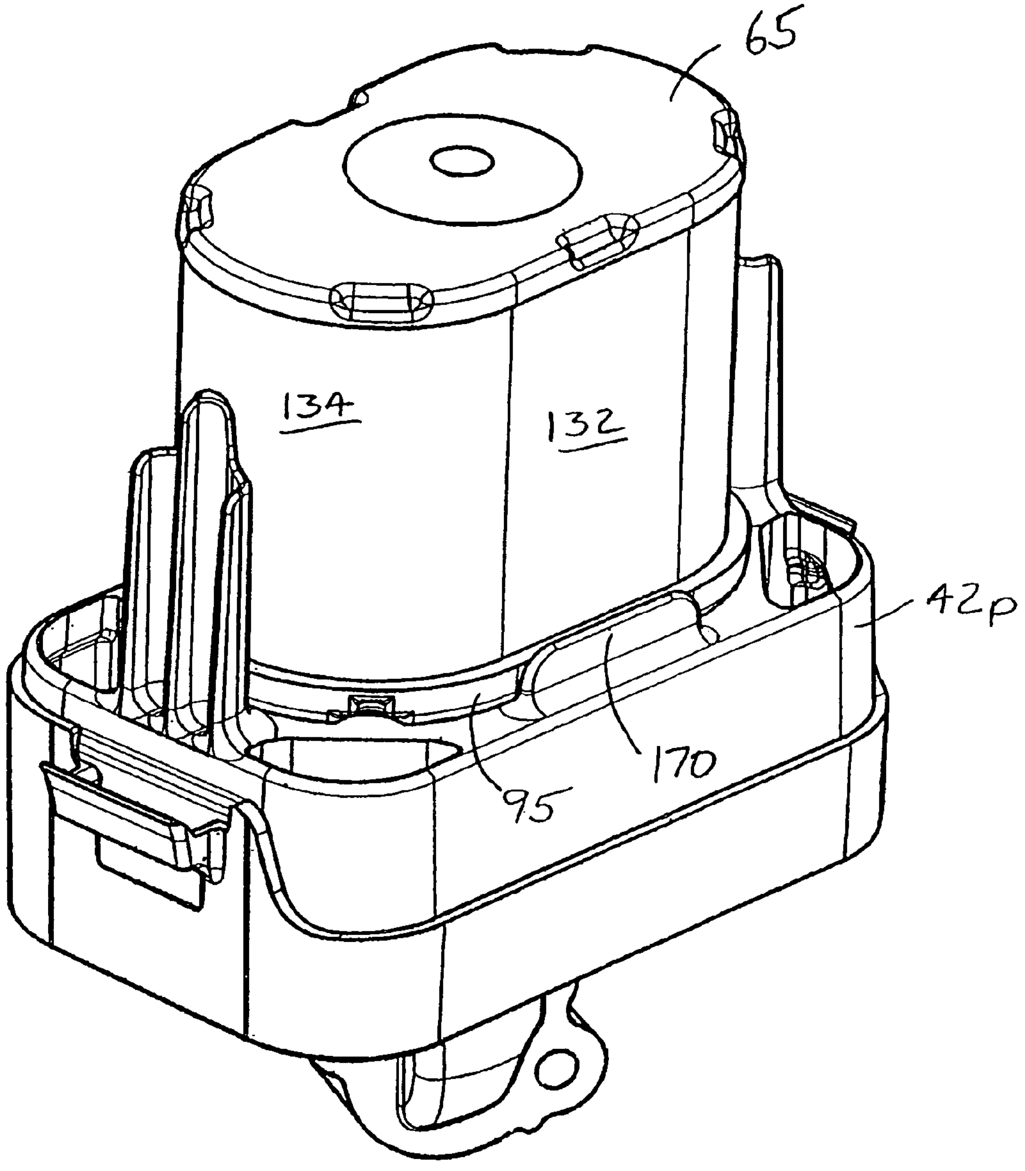
Figure 19:
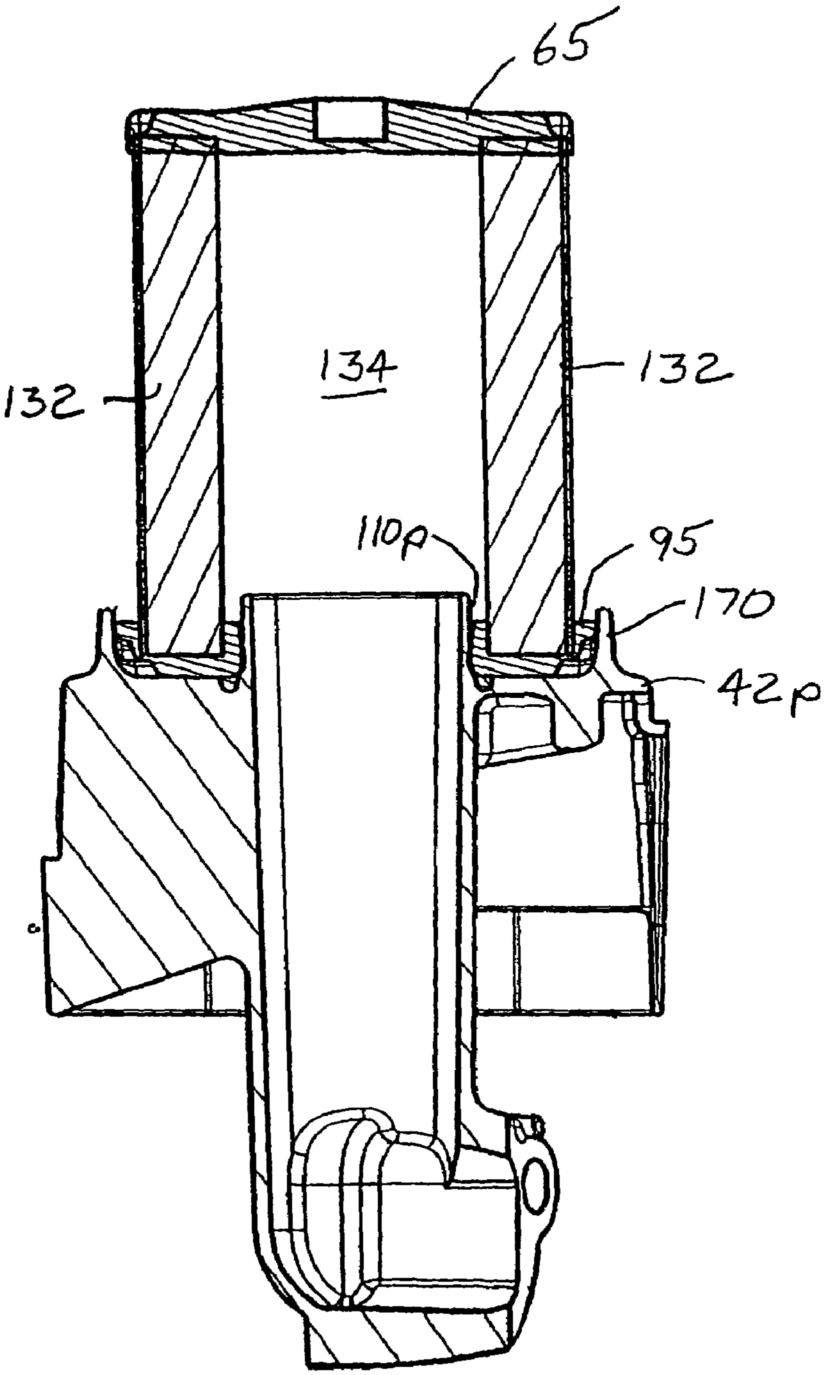

FIG. **4*a* is a perspective view of the air cleaner assembly of FIG. 2** with the cover and a filter element removed;

FIG. 5 is a sectional view of an air cleaner housing with a cover removed;

FIG. 6 is a bottom view of a filter element;

FIG. 7 is a perspective view of a filter element having a variable thickness wire mesh;

FIG. 8 is a perspective view of an air cleaner housing including a filter element having a variable density wire mesh;

FIG. 9 is a perspective view of an air cleaner housing including a filter element having a variable pattern wire mesh;

FIG. 10 is a perspective view of a wire mesh including a bent stiffener portion;

FIG. 11 is a perspective view of a filter element including a bridge stiffener;

FIG. 12 is a perspective view of an air cleaner housing arranged to receive the filter element of FIG. 11;

FIG. 13 is a sectional view of a filter element including side stiffeners;

FIG. 14 is a sectional view of a filter element including horseshoe stiffeners;

FIG. **14*a* is an enlarged view of the horseshoe stiffener of FIG. 14**;

FIG. 15 is a sectional view of a filter element including a variable height end cap;

FIG. 16 is a sectional view of a filter element including a variable width end cap;

FIG. 17 is a sectional view of a filter element including a spring stiffener;

FIG. **17*a* is a perspective view of a lower end cap of the filter element of FIG. 17**;

FIG. 18 is a perspective view of a air cleaner assembly with a cover removed and including side supports; and FIG. 19 is a sectional view of the air cleaner assembly of FIG. 18.

DETAILED DESCRIPTION

Figure 1:
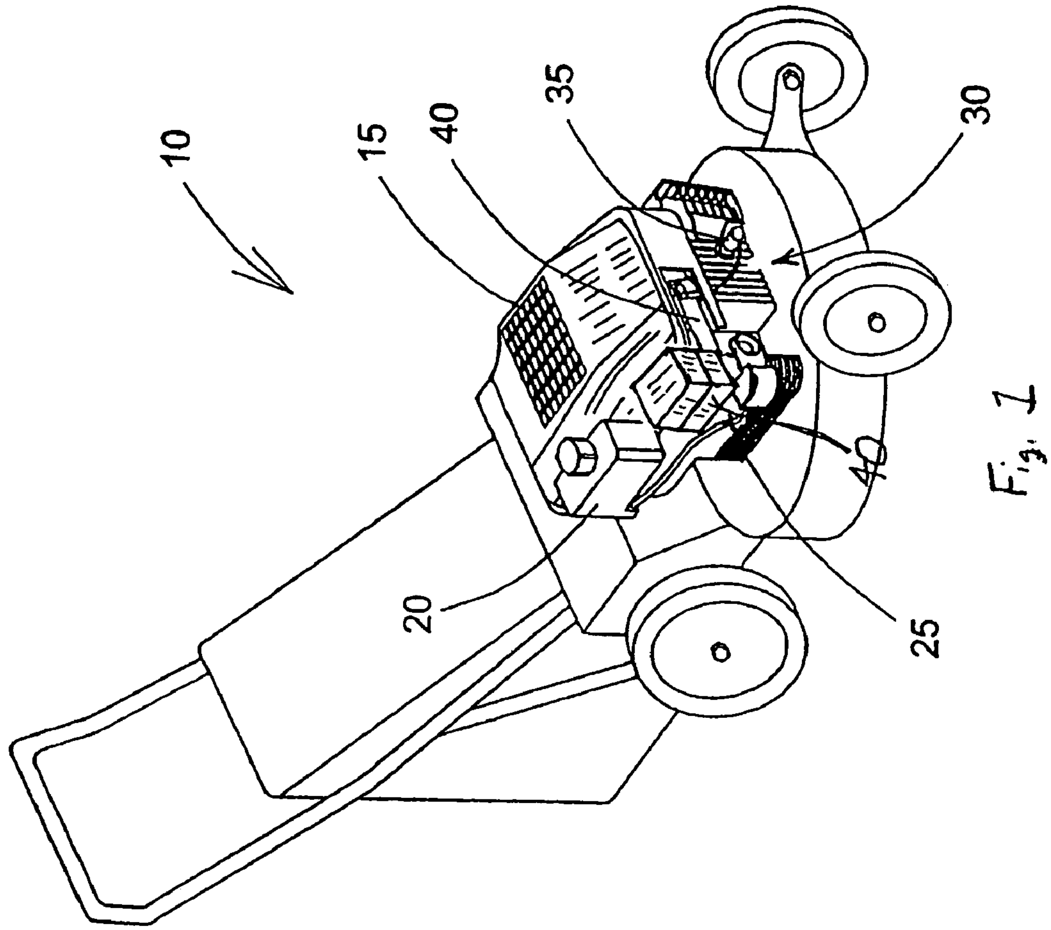
FIG. 1 is a perspective view of a lawn mower including an engine.

With reference to FIG. 1, a yard implement in the form of a lawn mower 10 is illustrated. The lawn mower 10 includes an engine 15 positioned to drive a rotating blade that cuts the grass beneath the lawn mower 10. Engines 15 of the type used to power the lawn mower 10 are also suited to power other types of outdoor power equipment (e.g., rototillers, power augers, edgers, log-splitters, string-trimmers, chipper/shredders, snow throwers, pressure washers, and generators).

One such engine 15, illustrated in FIG. 2, includes a fuel tank 20, a carburetor 25, a cylinder 30, a spark plug 35, and an air cleaner assembly 40. Air passes through the air cleaner assembly 40 before entering the carburetor 25. From the carburetor 25, the air/fuel mixture flows to the cylinder 30. The spark plug 35 ignites the air/fuel mixture within a combustion chamber disposed within the cylinder 30 to produce usable power.

It should be noted that while a spark-ignition internal combustion engine having a combustion chamber is described herein, the present invention is also well suited to use with other engines such as diesel engines that also provide for combustion within an enclosed combustion chamber but without the use of a spark.

Figure 3:
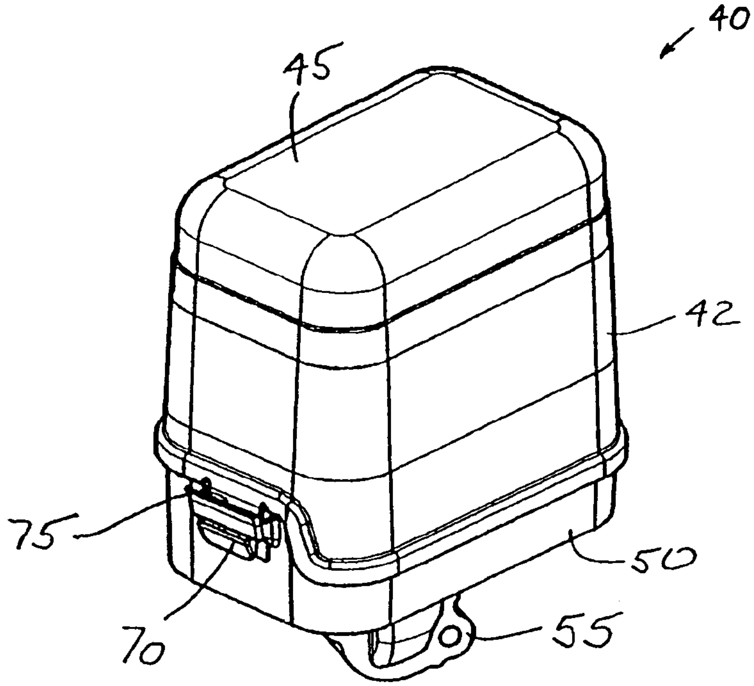
FIG. 3 is a perspective view of the air cleaner assembly of FIG. 2.
Figure 4:
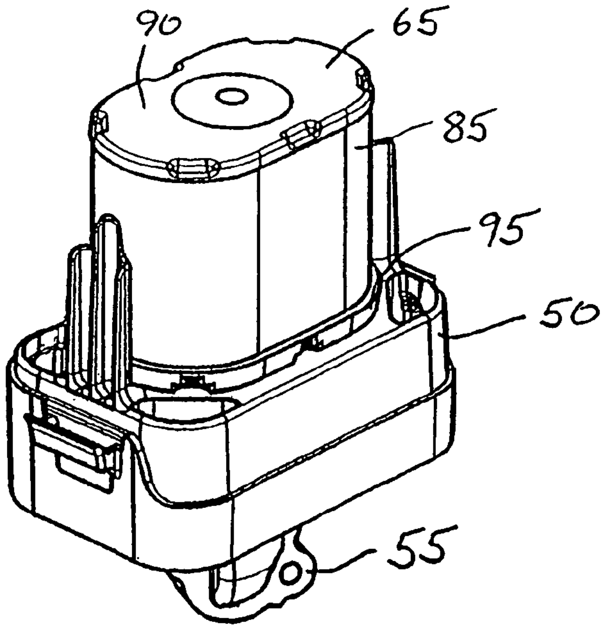
FIG. 4 is a perspective view of the air cleaner assembly of FIG. 2 with a cover removed.
Figure 4A:
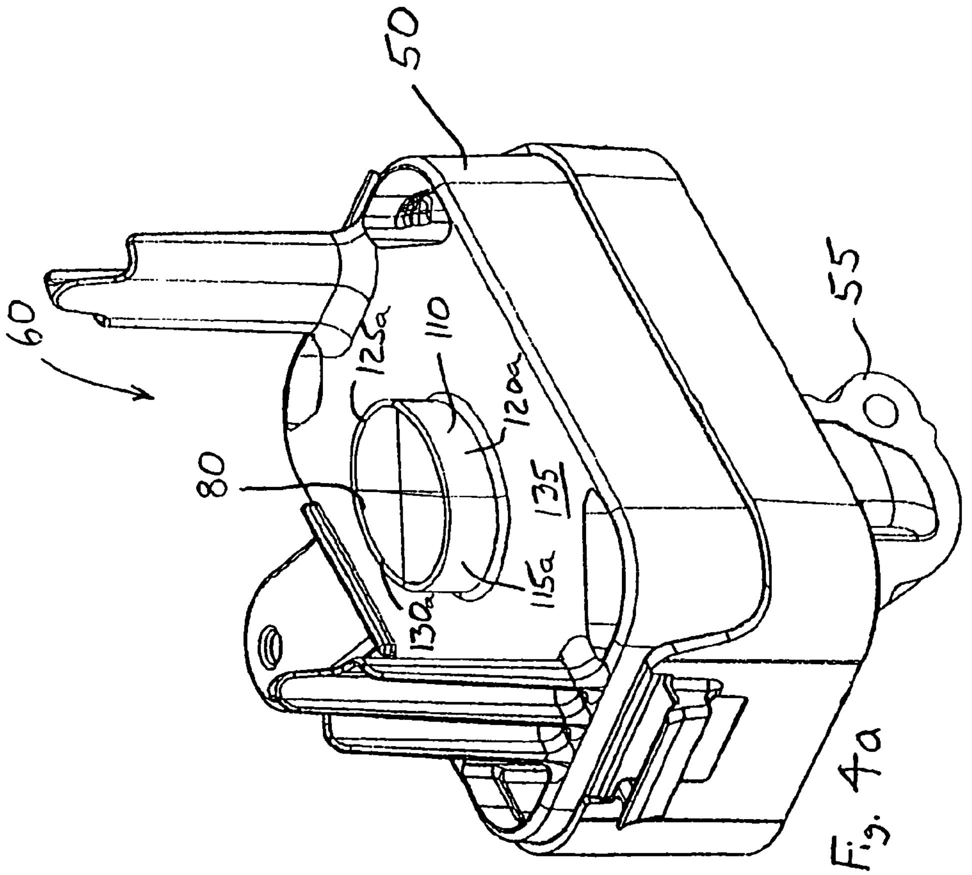

Turning to FIGS. 3, 4, and 4*a*, the air cleaner assembly 40 is shown in greater detail. The air cleaner assembly 40 includes an air cleaner housing 42 made up of an upper half 45, a lower half 50, and an air outlet tube 55. The upper half 45 and the lower half 50 attach to one another to define a filter element space 60. The filter element space 60 is sized to receive a filter element 65 (shown in FIG. 6). While the upper half 45 appears to be a solid cover, the two hidden sides include apertures that allow for the admission of air into the filter element space 60. In other constructions one, or three or more of the walls that make up the upper half 45 of the housing 42 include apertures. The upper half 45 also includes two hook members 70 (one shown) that engage slots 75 in the lower half 50 to lock the upper half 45 and the lower half 50 together.

The lower half 50 of the air cleaner housing 42 includes an aperture 80 (shown in FIG. 4*a*) that receives the filtered air and directs the filtered air to the air outlet tube 55. In preferred constructions, the air outlet tube 55 is formed as part of the lower half 50 of the air cleaner housing 42. However, other constructions employ an air outlet tube 55 that attaches to the lower half 50 of the air cleaner housing 42.

The filter element 65, shown in FIG. 6, includes a pleated portion 85 sandwiched between an upper end cap 90, and a lower end cap 95. A wire mesh 100 (shown in FIGS. 7-10) at least partially surrounds the outer surface of the pleated portion 85 and is sandwiched between the upper end cap 90 and the lower end cap 95. The wire mesh 100 provides additional structural support to the pleated filter media 85. The upper end cap 90 is solid and provides a substantially air-tight seal between the outside of the filter element 65 and the filter element space 60. The lower end cap 95 includes an air outlet 105 (shown in FIG. 6) that is substantially oval-shaped. The oval shape is determined by taking a cross-section in a plane that is perpendicular to the air flow path through the air outlet 105. The air outlet 105 provides for the escape of the filtered air from the filter element 65.

Preferred filter elements 65 use a paper material for the pleated portion 85 and a plastic, such as urethane for the end caps 90, 95 with other materials also being suited. While varying materials may improve or inhibit the function of the present invention, the constructions described herein will function with any filter element construction that is similar to that described.

As illustrated in FIG. 4*a,* an attachment fit 110 sized and shaped to engage the air outlet 105 of the filter element 65 surrounds the aperture 80 and provides a seal therebetween. The attachment fit 110 is substantially oval in shape, as measured in a plane perpendicular to an air flow path through the outlet 105, to allow for the engagement of the attachment fit 110 and the air outlet 105. The size of the air outlet 105 and the attachment fit 110 are chosen to provide a desired contact pressure therebetween. In most constructions, an interference fit is required (i.e., the attachment fit 110 is larger than the air outlet 105). Generally, the interference between the attachment fit 110 and the air outlet 105 is constant around the perimeter of the air outlet 105 (e.g., 0.025 inches). However, many constructions vary the interference to achieve the desired contact pressure.

For purposes of analysis and discussion, the attachment fit 110 as well as the perimeter that defines the air outlet 105 are each divided into four equal arc length segments. The air outlet 105 is divided into a first end segment 115, a first side segment 120, a second end segment 125, and a second side segment 130. The attachment fit is also divided into four corresponding equal arc length segments. A first end segment 115*a* corresponds with the first end segment 115 of the air outlet 105. Similarly, a first side segment 120*a,* a second end segment 125*a,* and a second side segment 130 a correspond with the first side segment 120, the second end segment 125, and the second side segment 130 respectively. The filter element 65 is also divided into four segments. Two side portions 132 are located near the side segments 120, 130 and two end portions 134 are located near the end segments 115, 125.

Due to the oval shape of the filter element 65, the end portions 134 tend to be stiffer than the side portions 132. As a consequence of employing an interference fit between the attachment fit 110 and the air outlet 105, the filter element tends to deflect when assembled. Because the sides 132 of a typical filter element 65 are not as stiff as the ends 134, any leakage between the attachment fit 110 and the air outlet 105 tends to occur between the side segments 120, 130. In addition, a constant interference fit around the perimeter will, in most cases, produce a varying amount of contact pressure due to the varying stiffness of the filter element 65.

The present invention varies the geometry or make up of the filter element and/or the air cleaner housing to achieve a substantially uniform contact pressure between a non-circular filter element and the air cleaner housing. In most constructions, the relative stiffness of the side portions 132 of the filter element is increased as compared to the end portions 134. This results in reduced deformation of the side portions 132 when the components are assembled. Other constructions limit the deformation of the side portions 132 or increase the interference of the side segments 120, 130 relative to the end segments 115, 125 to achieve the desired results. For example, in one construction it has been found that an interference ratio between the end segments 115, 120 and the side segments 120, 130 of about 60 percent produces substantially uniform contact pressure between the air outlet 105 and the attachment fit 110. Thus, a construction having 0.015 inches of interference at the end segments 115, 125 and 0.025 inches of interference at the side segments 120, 130 develops substantially uniform contact pressure between the air outlet 105 and the attachment fit 110 when assembled. In some constructions, manufacturing tolerances inhibit the use of interference fits below 0.020 inches. Thus, some applications may employ an interference adjacent the end segments 115, 125 of 0.020 inches and an interference adjacent the side segments 120, 130 of about 0.035 inches. As such, a range of interference for the end segments 115, 125 of between about 0.015 inches and 0.040 inches and a range of interference for the side segments 120, 130 of between about 0.020 inches and 0.075 inches is typical. Of course, other constructions may require different ratios or different levels of interference to achieve the desired results.

The figures included herewith depict several, but certainly not all of the ways of achieving uniform contact pressure between a filter element air outlet and an attachment fit. As such, other embodiments are within the scope of the invention.

With reference to FIG. 5, one arrangement of an air cleaner assembly 40*a* that accounts for, and corrects the varying contact pressure is illustrated. The air cleaner assembly includes an upper half (similar to the one shown in FIG. 3), a lower half 50*a*, an air outlet tube 55*a*, and a filter element 65*a*. The lower half 50*a* includes a tapered attachment fit 110*a* that engages a tapered air outlet 105*a* to provide a seal between the filter element 65*a* and the lower half 50*a* of the air cleaner housing 42*a*. For purposes of description, "tapered" is meant to include any surface that is angled between 0 degrees and 90 degrees with respect to a central axis A-A. While a tapered surface may include a portion that is parallel to the axis A-A (i.e., angled at 0 degrees), an entire surface that is parallel to the axis A-A should not be considered as "tapered."

To achieve substantially equal contact pressure around the entire perimeter of the air outlet 105*a*, the tapers vary. Thus, the taper in the side portions 132 is larger than the taper in the end portions 134. In one construction, the taper is essentially zero (i.e., vertical walls) in the end portions 134 and is at its maximum in the side portion 132 (as illustrated). The taper acts to force the side walls of the filter element 65*a* apart to increase the contact pressure in the side portions 132.

The lower half 50*a* of the air cleaner assembly 42 also defines a filter platform 135 that supports the filter element 65*a* in a vertical direction (parallel to the central axis A-A) and provides a stop when the filter element 65*a* is installed. During use, dirt or debris sometimes falls from the filter element 65*a* and collects on the filter platform 135. The attachment fit 110*a* extends above the filter platform 135 and inhibits entry of this debris into the air outlet tube 55*a* during replacement of the filter element 65*a*.

FIG. 7 illustrates another filter element 65*b* suited to use in an air cleaner assembly 40. The filter element 65*b* includes an oval air outlet 105*b*, a pleated filter media 85*b*, an upper end cap (similar to the one shown in FIG. 4), a lower end cap 95*b*, and a wire mesh 100*b* surrounding an outer surface of the pleated filter media 85*b*. The air outlet 105*b* is sized to provide an interference fit between the filter element 65*b* and the attachment fit 110 when the filter element 65*b* engages the attachment fit 110 of the air cleaner housing 42. The wire mesh 100*b* is formed from wire having a gauge or diameter. The wire is arranged in a pattern to define a mesh that allows air to pass freely through the pleated portion.

To improve the contact between the air outlet 105*b* and the attachment fit 110, the thickness of the wire mesh 100*b* is varied. The wire mesh 100*b* is thicker on the side portions 132*b* adjacent the side segments 120*b*, 130*b*, then it is at the end portions 134*b*. The thicker mesh 100*b* increases the stiffness of the side portions 132*b* of the filter element 65*b*, thereby making it more difficult for the side portions 132*b* to deflect. Thus, a uniform amount of interference results in a uniform contact pressure around the perimeter of the attachment fit 110.

There are several ways to thicken the wire mesh 100*b*. For example, in one construction, the gauge or diameter of the wire used to make the mesh is larger adjacent the side portions 132*b*. In another construction, additional layers of wire mesh are provided adjacent the side portions 132*b*. No matter the construction employed, the intent is to establish a thicker layer of mesh adjacent the side portions 132*b* of the filter element 65*b*.

FIGS. 8 and 9 illustrate other constructions of filter elements positioned in operating positions. The filter elements engage the lower half of the air cleaner housing in much the same manner as has been described. Generally, a uniform interference fit between the attachment fit and the air outlet is used. To stiffen the filter element on the side surfaces, the pattern used to form a wire mesh 100*c* is varied. In FIG. 8, the mesh density is increased in the side portions 132*c* of the filter element 65*c* (i.e., additional rows of similar gauge wire are applied adjacent the side portions 132*c*). The increased density of the side surfaces 132*c* with respect to the end portions 134*c* inhibits the deflection of the side surfaces 132*c* and functions to maintain a consistent level of contact pressure between the attachment fit 110 and the air outlet.

FIG. 9 achieves similar results by varying the pattern, or orientation, of the wire mesh 100*d* rather than the density. As shown in FIG. 9, the mesh is arranged in a grid that defines square openings in the side portion 132*d* and the mesh is arranged to define diamond openings in the end portions 134*d*. The arrangement that defines square openings provides increased stiffness when compared to the pattern that defines diamond openings. Different arrangements of wire result in different stiffness characteristics, thereby allowing the filter element 65*d* to function as desired.

FIG. 10 illustrates yet another construction of the wire mesh 100*e* that functions to improve the stiffness of a filter element adjacent the side portions 132*e*. The wire mesh 100*e* includes a bent portion 140 adjacent each side portion 132*e*. The bent portion 140 increases the stiffness of the wire mesh 100*e* adjacent the side portions 132*e* without significantly affecting the stiffness of the end portions 134*e*. Thus, when assembled, the side portions 132*e* and end portions 134*e* deflect a similar amount, thereby resulting in substantially uniform contact pressure around the perimeter for a uniform interference.

While FIGS. 7-10 illustrate several arrangements that improve the side stiffness of the filter element by manipulating the wire mesh, it should be understood that these arrangements could be used in combination if desired. In addition, it should be clear to one of ordinary skill that other variations of the wire mesh could be used to improve the stiffness of the sides of the filter element. For example, different materials could be used to vary the stiffness of the wire mesh. As such, the invention should not be limited to the few examples described herein.

FIGS. 11 and 12 illustrate another construction of a filter element 65*f* that includes a stiffening bar 145 coupled to a lower end cap 95*f* of the filter element 65*f*. The stiffening bar 145 extends across an air outlet 105*f* and interconnects the two side segments 120*f*, 130*f*. The stiffening bar 145 inhibits movement of the side portions 132*f* away from one another when the filter element 65*f* engages the air cleaner housing 42*f*. Thus, the end portions 132*f* and the side portions 134*f* exhibit a similar stiffness and provide for a substantially uniform contact pressure between the filter element 65*f* and the air cleaner housing 42*f* around the perimeter of the air outlet 105*f*. In most constructions, the stiffening bar 145 is formed as part of the filter element 65*f* However, other constructions include a separate stiffening bar 145 that attaches to the filter element 65*f*. While a circular stiffening bar 145 is illustrated, other shapes (e.g., square, rectangular, oval, streamlined, and the like) can also be used. For example, air flow considerations may warrant the use of a streamlined stiffening bar to minimize flow losses.

To allow for assembly, the lower half 50*f* of the air cleaner housing 42*f* includes two notches 150 illustrated in FIG. 12. The notches 150 are formed in the attachment fit 110*f* and are positioned to receive the stiffening bar 145. In another construction, the stiffening bar 145 is positioned above the attachment fit 110*f* when the filter element 65*f* is engaged with the attachment fit 110*f*. In these constructions, there is no interference, and therefore, no need for notches 150. Furthermore, while the notches 150 are illustrated as conforming to the shape of the stiffening bar 145, there is no requirement that notches 150 conform to the stiffening bar 145. For example, square notches could be used to receive a circular stiffening bar.

Turning to FIG. 13, another construction of a filter element 65*g* is illustrated. The filter element 65*g* includes a lower end cap 95*g* having two stiffeners 155 embedded therein. The stiffeners 155 are located adjacent the side portions 132*g* of the filter element 65*g* and inhibit movement of the side portions 132*g* without significantly affecting the end portions 134*g*. FIG. 13 illustrates stiffeners 155 that are rectangular in cross-section. However, many other cross-sections (e.g., square, circular, channel, tubular, I-beam, and the like) could be used to achieve the stiffness desired.

In addition to the shape of the stiffener 155, the material can also be varied to achieve the desired stiffness. For example, one construction uses a plastic material, while another construction that requires additional stiffness employs steel or another metal. As one of ordinary skill will realize, many different sizes, shapes, and materials can be used in various combinations to make stiffeners 155 that achieve the desired stiffness. In yet another construction, foam is placed in the end portions 134 of the filter element 65 to reduce the stiffness of the end portions 134 as compared to the stiffness of the side portions 132.

Figure 14A:
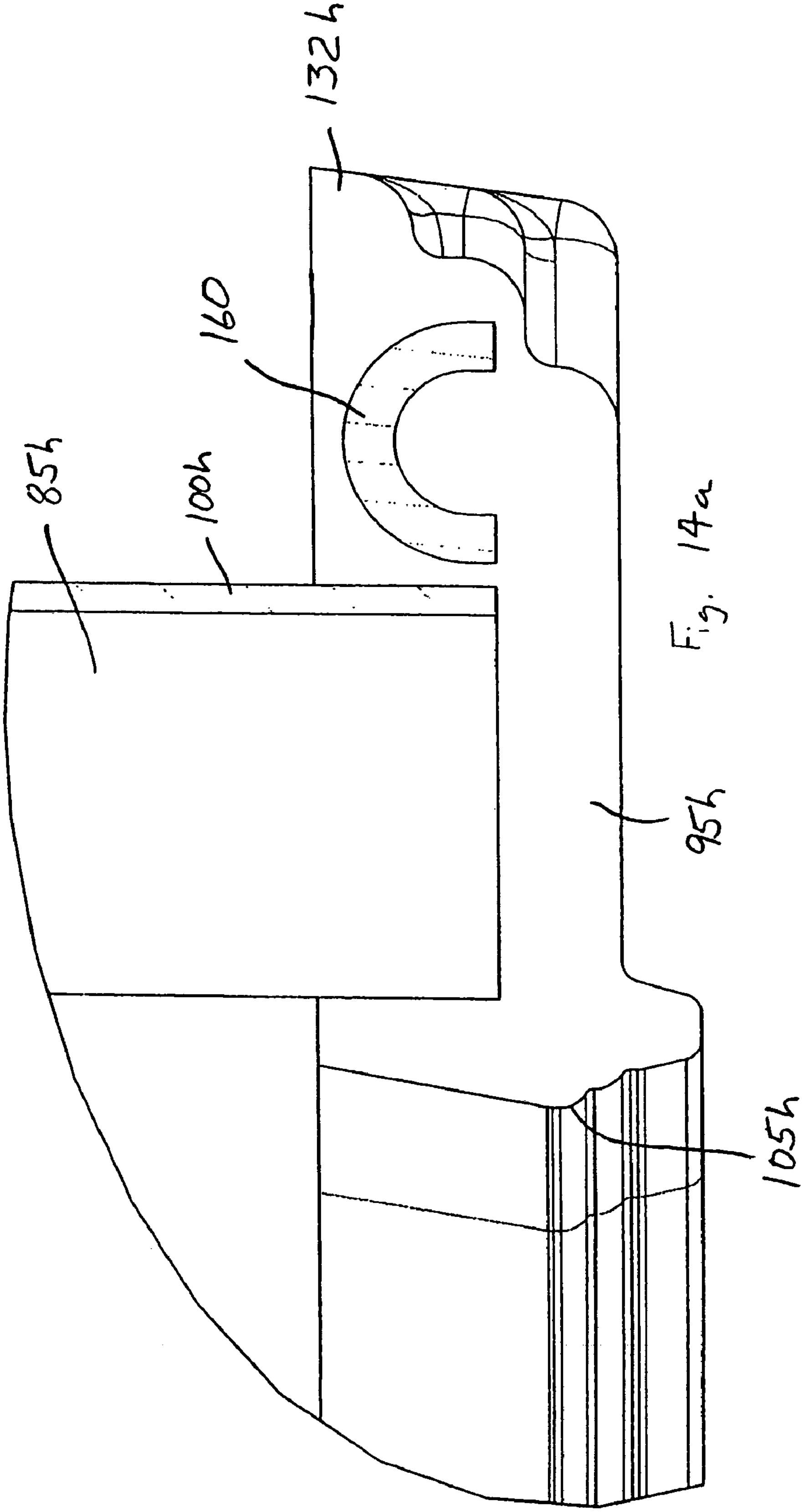

FIGS. 14 and 14*a* illustrate another construction of a filter element 65*h* in which shaped-springs are used to stiffen the side portions 132*h* of the filter element 65*h*. While many different shapes can be used for the springs (e.g., S-shaped, circular and the like), the construction of FIGS. 14 and 14*a* employs horseshoe-shaped springs 160. The springs 160 not only stiffen the side portions 132*h* of the filter element 65*h*, they also generate a reaction force that increases the contact pressure within the air outlet 105*h* adjacent the springs 160. In addition to the horseshoe-shaped springs, the filter element includes an upper end cap, 90*h*, a lower end cap 95*h*, a pleated portion 85*h*, and a wire mesh 100*h*.

FIGS. 15 and 16 illustrate filter element constructions that vary the geometry of the lower end cap to provide for varying stiffness between the side portions and the end portions. FIG. 15 illustrates a construction of a filter element 65*k* in which the thickness (or the height) of a lower end cap 95*k* is increased along the side portions 132*k* as compared to the end portions 134*k*. The increased height increases the stiffness of the lower end cap 95*k* on the side portions 132*k* relative to the end portions 134*k*. This increase allows the side portions 132*k* to deflect a similar amount as compared to the end portions 134*k* for a given interference fit. Thus, when the air outlet 105*k* of the filter element 65*k* engages the attachment fit 110, a substantially uniform contact pressure is established around the attachment fit 110.

The filter element construction of FIG. 16 functions in much the same manner as the construction of FIG. 15. However, rather than increasing the thickness of a lower end cap 95*m* of the filter element 65*m*, the construction of FIG. 16 includes a lower end cap 95*m* that is wider in the side portions 132*m* than in the end portions 134*m*. The width increases the stiffness of the lower end cap 95*m* in the side portions 132*m*. As one of ordinary skill will realize, many geometrical changes can be made to the filter element to achieve the stiffness desired. As such, the invention should not be limited to the few examples described herein.

Figure 17A:
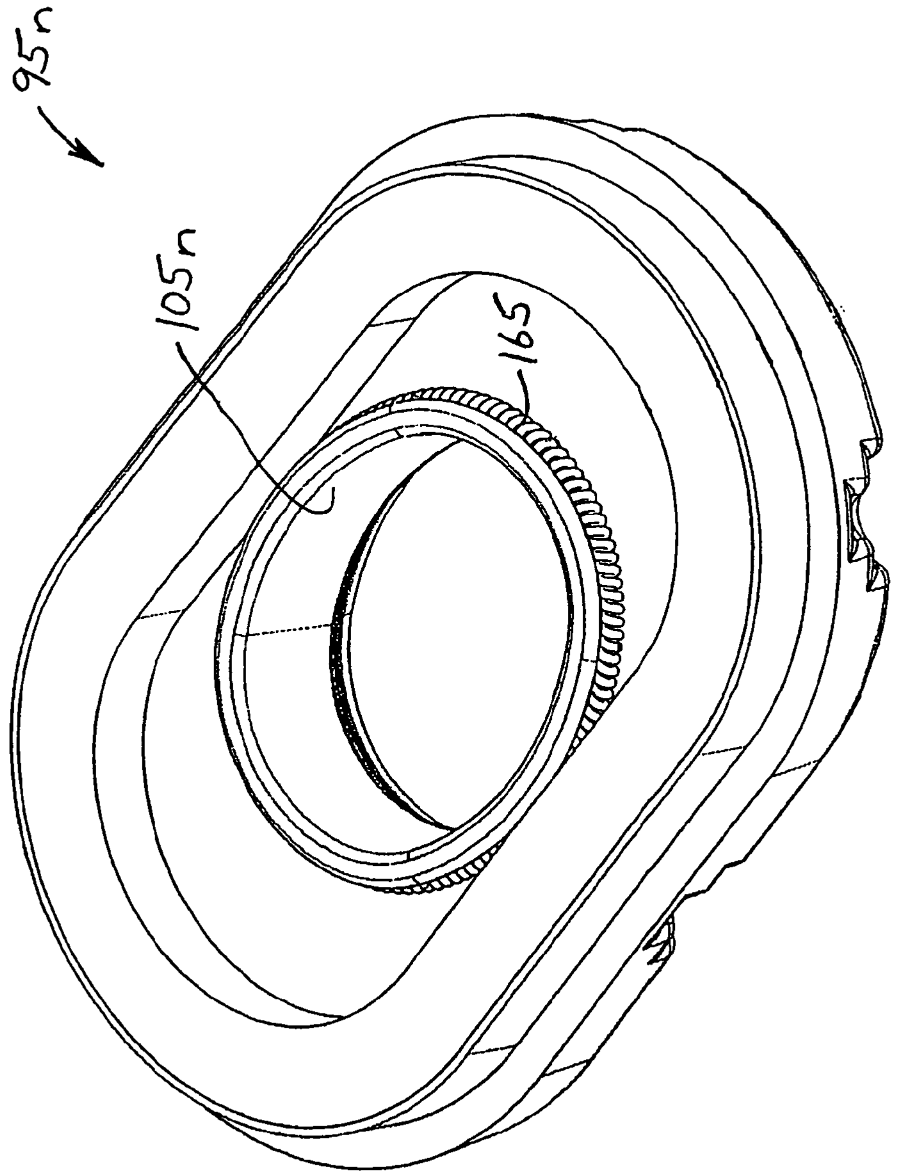

With reference to FIGS. 17 and 17*a*, another construction of a filter element 65*n* is illustrated. The filter element 65*n* includes an upper end cap 90*n*, a lower end cap 95*n*, a pleated portion 85*n*, a wire mesh 100*n*, and a spring, in the form of a variable rate garter spring 165, that surrounds an air outlet 105*n*. Garter springs 165 are helical extension or compression springs with ends that are connected to allow the spring 165 to be held in a circle. One end may be coned or looped to allow it to engage the opposite end. The garter spring 165 applies a compressive force to the air outlet 105*m* and aids in achieving a consistent seal between the air outlet 105*n* and the attachment fit 110 around the entire perimeter of the air outlet 105*n*. The variable rate garter spring 165 is completely defined by four substantially equal arc length segments, with two opposite segments having an increased stiffness relative to the remaining two segments. The two stiff segments are positioned near the side portions of the filter aperture, and the remaining two segments are disposed near the end portions of the aperture. This arrangement allows the garter spring 165 to apply an increased force near the side portions as compared to the force near the end portions.

In yet another construction, illustrated in FIG. 18 and 19, side protrusions 170 formed as part of an air cleaner housing 42*p* restrain side portions 132 of a filter element 65. In the installed position, the side portions 132 are sandwiched between the side protrusions 170 and an attachment fit 110*p*. The position of the side protrusions 170 allows for some displacement of the side portions 132. However the side portion displacement is similar to the end portion displacement. Thus, the construction results in substantially uniform contact pressure between the attachment fit 110*p* and the air outlet 105 around the entire perimeter of the air outlet 105.

As one of ordinary skill will realize, there are many possible constructions of filter elements and air cleaner housings that provide for uniform contact pressures between the filter element air outlet and the air cleaner housing attachment fit around the perimeter of the air outlet. Thus, the invention should not be limited to the few examples discussed herein.

Although the invention has been described in detail with reference to certain preferred embodiments, variations and modifications exist within the scope and spirit of the invention as described and defined in the following claims.

What is claimed is:

1. An air cleaner comprising:

a first housing portion including a non-circular attachment fit;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the attachment fit is a substantially oval protrusion that has two protrusion end portions and two protrusion side portions, and wherein the filter perimeter is substantially oval and defines two perimeter end portions and two perimeter side portions, and wherein the protrusion side portions and the perimeter side portions cooperate to define a first interference, and wherein the protrusion end portions and the perimeter end portions cooperate to define a second interference different from the first interference.

2. The air cleaner of claim 1, wherein the first interference is at least 20 percent greater than the second interference.

3. The air cleaner of claim 1, wherein the first interference is about 60 percent greater than the second interference.

4. The air cleaner of claim 1, wherein the first housing portion includes a first attachment member integrally-formed as part of the first housing portion and the second housing portion includes a second attachment member integrally-formed as part of the second housing portion, the first attachment member engageable with the second attachment member.

5. An air cleaner comprising:

a first housing portion including a non-circular attachment fit, wherein the attachment fit includes a substantially oval protrusion;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the filter element includes a first side portion having a first stiffening member, and a second side portion having a second stiffening member.

6. The air cleaner of claim 5, wherein the first stiffening member is integrally-formed as part of the first side portion, and the second stiffening member is integrally-formed as part of the second side portion.

7. The air cleaner of claim 5, wherein the first stiffening member and the second stiffening member each include a substantially flat strip.

8. An air cleaner comprising:

a first housing portion including a non-circular attachment fit;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the filter element includes a first side portion having a first stiffening member and a second side portion having a second stiffening member, and wherein the filter element includes a resilient end cap, and wherein the first stiffening member and the second stiffening member are embedded within the end cap.

9. An air cleaner comprising:

a first housing portion including a non-circular attachment fit;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the filter element includes a first side portion having a first stiffening member and a second side portion having a second stiffening member, and wherein the first stiffening member and the second stiffening member each include a C-shaped strip.

10. An air cleaner comprising:

a first housing portion including a non-circular attachment fit, wherein the attachment fit includes a substantially oval protrusion;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the filter element includes an end cap that includes a side portion that has a side cross-sectional area and an end portion that has an end cross-sectional area, the side cross-sectional area being greater than the end cross-sectional area.

11. An air cleaner comprising:

a first housing portion including a non-circular attachment fit;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the air cleaner includes a mesh having an end pattern and a side pattern different from the end pattern.

12. An air cleaner comprising:

a first housing portion including a non-circular attachment fit;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the first housing portion includes a biasing member positioned adjacent a portion of the filter perimeter, the biasing member operable to increase the contact pressure between the filter element and the attachment fit near the biasing member.

13. The air cleaner of claim 12, wherein the biasing member includes a tapered surface.

14. An air cleaner comprising:

a first housing portion including a non-circular attachment fit;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the filter element includes a spring member that is near the perimeter.

15. The air cleaner of claim 14, wherein the spring is a variable rate garter spring.

16. An air cleaner comprising:

a first housing portion including a non-circular attachment fit;

a second housing portion attached to the first housing portion to define a filter space; and a filter element including a non-circular filter aperture having a perimeter, the perimeter engageable with the attachment fit, the attachment fit and the filter aperture sized to provide substantially equal contact pressure around the perimeter when the perimeter is engaged with the attachment fit, wherein the non-circular attachment fit is an oval completely defined by first and second substantially straight side portions and first and second curved portions, the first and second side portions defining first and second arc lengths, and the first and second curved portions defining third and fourth arc lengths, the first, second, third, and fourth arc lengths being substantially equal.

17. A filter element for use in an air cleaner having an attachment fit, the filter element comprising:

a substantially oval filter perimeter defining an outlet, the perimeter including a filter end portion having a filter end stiffness and a filter side portion having a filter side stiffness, the filter perimeter engageable with the attachment fit;

a stiffening member disposed outside of the outlet and adjacent the filter side portion such that the filter side stiffness is substantially equal to the filter end stiffness when the filter perimeter is engaged with the attachment fit; and a resilient end cap, wherein the stiffening member is embedded within the resilient end cap.

18. The filter element of claim 17, wherein the stiffening member includes an end cap that includes a side portion that defines a side cross-sectional area and an end portion that defines an end cross-sectional area, the side cross-sectional area being greater than the end cross-sectional area.

19. The filter element of claim 17, wherein the stiffening member is a substantially flat strip.

20. The filter element of claim 17, wherein the stiffening member is a C-shaped strip.

21. A filter element for use in an air cleaner having an attachment fit, the filter element comprising:

a substantially oval filter perimeter defining an outlet, the perimeter including a filter end portion having a filter end stiffness and a filter side portion having a filter side stiffness, the filter perimeter engageable with the attachment fit;

a stiffening member disposed outside of the outlet and adjacent the filter side portion such that the filter side stiffness is substantially equal to the filter end stiffness when the filter perimeter is engaged with the attachment fit; and a mesh having an end pattern and a side pattern different from the end pattern.

22. The filter element of claim 21, wherein the mesh includes a side portion having a side thickness and an end portion having an end thickness, the side thickness being greater than the end thickness.

23. A filter element for use in an air cleaner having an attachment fit, the filter element comprising:

a substantially oval filter perimeter defining an outlet, the perimeter including a filter end portion having a filter end stiffness and a filter side portion having a filter side stiffness, the filter perimeter engageable with the attachment fit;

a stiffening member disposed outside of the outlet and adjacent the filter side portion such that the filter side stiffness is substantially equal to the filter end stiffness when the filter perimeter is engaged with the attachment fit; and a spring member near the perimeter.

24. A filter element for use in an air cleaner having an attachment fit, the filter element comprising:

a substantially oval filter perimeter defining an outlet, the perimeter including a filter end portion having a filter end stiffness and a filter side portion having a filter side stiffness, the filter perimeter engageable with the attachment fit;

a stiffening member disposed outside of the outlet and adjacent the filter side portion such that the filter side stiffness is substantially equal to the filter end stiffness when the filter perimeter is engaged with the attachment fit, wherein the substantially oval perimeter is completely defined by first and second substantially straight side portions and first and second curved portions, the first and second side portions defining first and second arc lengths, and the first and second curved portions defining third and fourth arc lengths, the first, second, third, and fourth arc lengths being substantially equal.

25. A filter element for use with an air cleaner having an attachment perimeter, the filter element comprising:

a first end cap;

a second end cap including a perimeter that defines a first side portion having a side stiffness, a first end portion having an end stiffness, and an outlet aperture;

a filter media disposed between the first end cap and the second end cap; and a stiffening member positioned to increase the side stiffness relative to the end stiffness, wherein the stiffening member is embedded in the first side portion.

26. The filter element of claim 25, wherein the stiffening member is a substantially flat strip.

27. The filter element of claim 25, wherein the stiffening member is a substantially C-shaped strip.

28. The filter element of claim 25, wherein the side portion defines a side cross-sectional area and the end portion defines an end cross-sectional area, the side cross-sectional area being greater than the end cross-sectional area.

29. A filter element for use with an air cleaner having an attachment perimeter, the filter element comprising:

a first end cap;

a second end cap including a perimeter that defines a first side portion having a side stiffness, a first end portion having an end stiffness, and an outlet aperture;

a filter media disposed between the first end cap and the second end cap;

a stiffening member positioned to increase the side stiffness relative to the end stiffness; and a mesh positioned outside of the filter media between the first end cap and the second end cap, wherein the mesh has an end portion and a side portion.

30. The filter element of claim 29, wherein the side portion has a side thickness and the end portion has an end thickness, the side thickness being greater than the end thickness.

31. The filter element of claim 29, wherein the side portion has a side pattern and the end portion has an end pattern, the side pattern being different than the end pattern.

32. A filter element for use with an air cleaner having an attachment perimeter, the filter element comprising:

a first end cap;

a second end cap including a perimeter that defines a first side portion having a side stiffness, a first end portion having an end stiffness, and an outlet aperture;

a filter media disposed between the first end cap and the second end cap;

a stiffening member positioned to increase the side stiffness relative to the end stiffness; and a spring member near the perimeter.

33. A filter element for use with an air cleaner having an attachment perimeter, the filter element comprising:

a first end cap;

a second end cap including a perimeter that defines a first side portion having a side stiffness, a first end portion having an end stiffness, and an outlet aperture;

a filter media disposed between the first end cap and the second end cap; and a stiffening member positioned to increase the side stiffness relative to the end stiffness, wherein the substantially oval perimeter is completely defined by first and second substantially straight side portions and first and second curved portions, the first and second side portions defining first and second arc lengths, and the first and second curved portions defining third and fourth arc lengths, the first, second, third, and fourth arc lengths being substantially equal.

* * * * *